US008146099B2

(12) United States Patent
Tkatch et al.

(10) Patent No.: US 8,146,099 B2
(45) Date of Patent: Mar. 27, 2012

(54) SERVICE-ORIENTED PIPELINE BASED ARCHITECTURE

(75) Inventors: Alexander Tkatch, Sammamish, WA (US); Ghanaie-Sichanie Arash, Bothell, WA (US); Akezyt Janedittakarn, Bellevue, WA (US); Michael J. Ott, Redmond, WA (US); Nishant Gupta, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1216 days.

(21) Appl. No.: 11/862,648

(22) Filed: Sep. 27, 2007

(65) Prior Publication Data

US 2009/0089128 A1    Apr. 2, 2009

(51) Int. Cl.
*G06F 9/44* (2006.01)
(52) U.S. Cl. .................... 719/316; 719/328; 719/330
(58) Field of Classification Search .......... 719/310, 719/316, 328, 330
See application file for complete search history.

(56) References Cited

U.S. PATENT DOCUMENTS

| | | | |
|---|---|---|---|
| 6,377,939 B1 | 4/2002 | Young | |
| 6,782,531 B2 | 8/2004 | Young | |
| 6,859,798 B1 * | 2/2005 | Bedell et al. | 706/45 |
| 6,985,946 B1 | 1/2006 | Vasandani et al. | |
| 6,993,534 B2 | 1/2006 | Denesuk et al. | |
| 7,222,148 B2 | 5/2007 | Potter et al. | |
| 7,263,686 B2 * | 8/2007 | Sadiq | 717/110 |
| 7,657,898 B2 * | 2/2010 | Sadiq | 719/330 |
| 7,779,017 B2 * | 8/2010 | Haselden et al. | 707/756 |
| 2002/0035559 A1 * | 3/2002 | Crowe et al. | 707/2 |
| 2004/0148183 A1 * | 7/2004 | Sadiq | 705/1 |
| 2004/0148185 A1 * | 7/2004 | Sadiq | 705/1 |
| 2005/0234969 A1 | 10/2005 | Mamou et al. | 707/102 |
| 2006/0010195 A1 | 1/2006 | Mamou et al. | |
| 2006/0031432 A1 | 2/2006 | Patrick et al. | |
| 2006/0048097 A1 | 3/2006 | Doshi | 717/120 |
| 2006/0200556 A1 | 9/2006 | Brave et al. | |
| 2007/0011437 A1 | 1/2007 | Carnahan | |

FOREIGN PATENT DOCUMENTS

WO    WO 2005/052720 A2    6/2005

OTHER PUBLICATIONS

A Service-Oriented Architecture for Development and Design of Middleware, Yih-Cheng Lee, et al., Computer Society, IEEE (2005) (5 pgs.) http://ieeexolore.ieee.org./iel5/10689/33749/01607155.pdf?isNumber=.

(Continued)

*Primary Examiner* — Van Nguyen
(74) *Attorney, Agent, or Firm* — Merchant & Gould

(57) ABSTRACT

Service-oriented systems employing pipeline architecture to accommodate third party extensions for extending existing functionality or providing additional functionality are provided. User or third party provided plug-ins are registered through metadata and executed in a pipeline along with platform operations. The pipeline is extendable on the fly with newly uploaded plug-ins. Dependency analyses for ordering synchronous or asynchronous pipeline operations enable multiple parties to extend the system and operate predictably. Loop detection mechanisms prevent misuse of system resources through accidental or malicious creation of infinite loops with exceptions for non-degenerate infinite loops.

16 Claims, 7 Drawing Sheets

OTHER PUBLICATIONS

Pradraig O'Dowd, et al. Integrating XML forms-based processes into Service-Oriented Architectures using IBM Workplace Forms Services Platform, IBM, http://www.ibm.com/developerworks/lotus/library/forms-soa/, Apr. 3, 2007.

International Search Report issued Apr. 14, 2009 in PCT/US2008/078107 filed Sep. 29, 2008.

Vinci: A Service-Oriented Architecture for Rapid Development of Web Applications, Rakesh Agrawal, et al., IBM Almaden Research Center (pp. 355-365), May 2001, http://www.db.cs.cmu.edu/db-site/Pubs/Lib/www01vinci/www01_vinci.pdf.

Carousel Web service: Universal Accessible Web service Architecture for Collaborative Application, Geoffrey Fox, et al. (pp. 1-11), Nov. 2002, http://grids.ucs.indiana.edu/ptliupages/publications/Carousel_PerCom03.doc.

* cited by examiner

SERVICE-ORIENTED PIPELINE BASED ARCHITECTURE

BACKGROUND

Hosted services are becoming increasingly common, where various applications service a large number of customers on shared hardware (referred to as a multi-tenant system). Hosted services may provide a common type of service to many clients or multiple services to a single client. As such hosted services can be fairly complex systems. A representative example of complex hosted service systems is a web based Customer Relationship Management (CRM) service.

CRM solutions provide tools and capabilities needed to create and maintain a clear picture of customers, from first contact through purchase and post-sales, typically in a hosted computer application environment. For complex tenants, a CRM system may provide features and capabilities to help improve the way sales and marketing organizations target new customers, manage marketing campaigns, and drive sales activities. CRM systems may include many components, hardware and software, utilized individually or in a shared manner by users internal or external to the tenant.

Complex systems such as hosted CRM services need to perform a series of operations in response to client requests. These operations can be synchronous or asynchronous, can have order dependencies, and can be implemented by disparate parties. One challenge in implementing such a system is managing complexity of the system, especially as third party providers add operations. This challenge may be exacerbated in Software as a Service (SaaS) applications, where third party extensions are not fully trusted by the service provider.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to providing a hosted service employing pipeline architecture. Third party extensions for extending existing functionality or providing additional functionality are registered through metadata and executed in a pipeline serially with platform operations, where an order of operations and a stage of each operation are exchanged through metadata such that system functionality and custom functionality are treated symmetrically. Loop detection mechanisms may also be employed to prevent misuse of system resources through accidental or malicious creation of infinite loops.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, pipeline architecture may be implemented in a service-oriented system for managing third party plug-in functionality. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
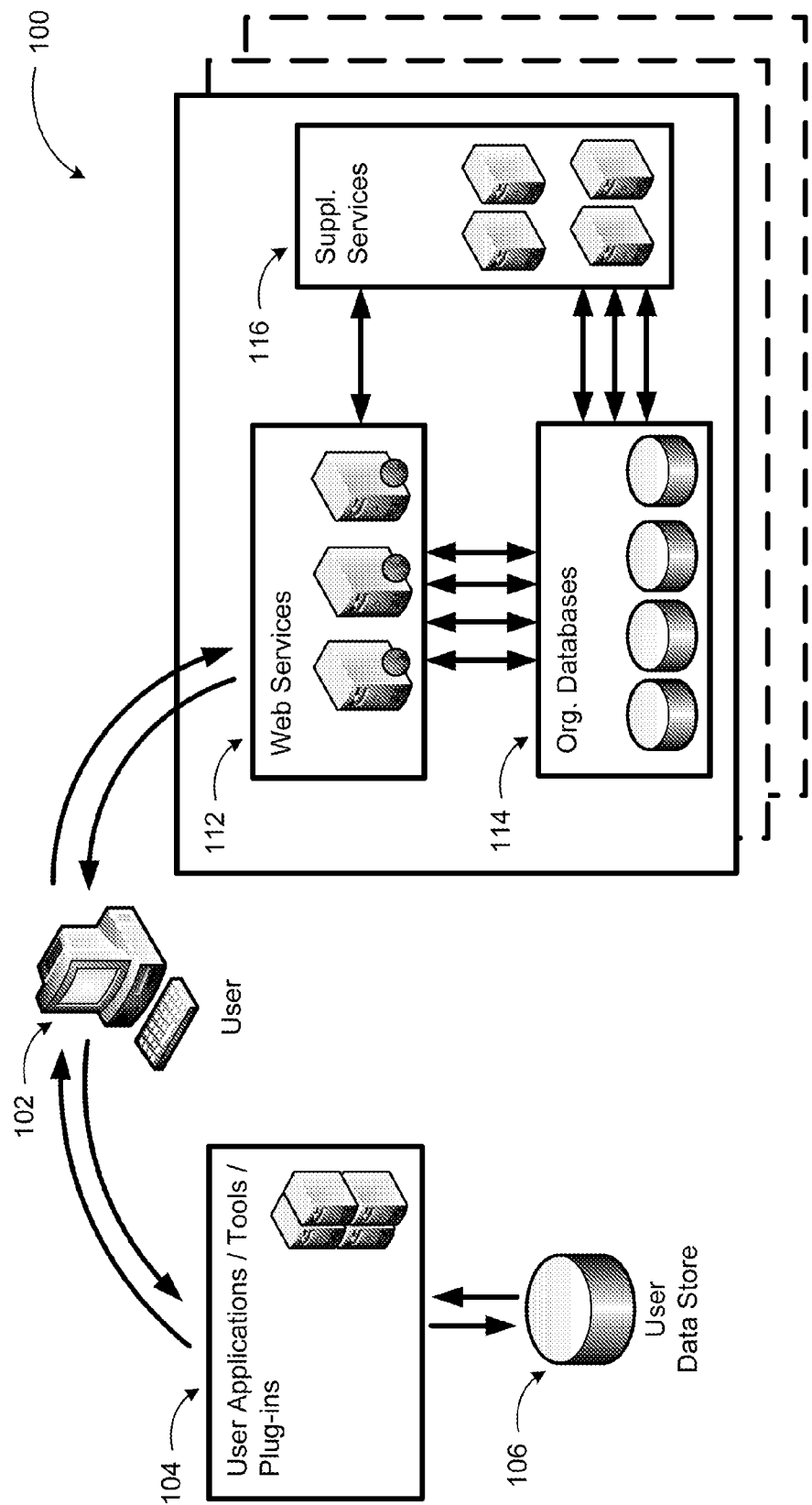
FIG. 1 is a diagram illustrating an example multi-tenant service system architecture.

Referring to FIG. 1, diagram 100 of example multi-tenant service system architecture is illustrated. In a typical multi-tenant system, users associated with different tenants may request operations from a service which may perform synchronous and asynchronous operations involving tenant-specific information.

As discussed above, hosted services facilitate interactions between various applications and a large number of customers on shared hardware with numerous aspects of default and customized functionality. For example, a Customer Relationship Management (CRM) service may enable user associated with multiple tenants to record, follow-up, analyze, and process contacts, sales leads, and so on, while providing security and custom functionality to each tenant. Some of the custom (or default) functionality for these so-called Software as a Service (SaaS) applications may be provided in the form of third party extensions or plug-ins that are registered and executed alongside core platform operations.

In a typical hosted service environment, scalable and redundant groups of web services servers 112 work with tenant data stores 114 to store and process data associated with individual tenants of the service. Supplemental services 116 may be also provided through another group of servers and/or data stores. For example, synchronous and asynchronous processing may be performed by different groups of servers in a distributed manner optimizing system performance.

By employing independent distribution of synchronous and asynchronous processes and the interaction between the servers and the databases, any part of the hosted service group may be made scalable. Thus, multiple instances of the servers (and/or databases) may be provided to address increased workload, additional tenants, data capacity, and so on.

In an operation, the hosted service receives input data (e.g. new contact information in a CRM service) and requests for processing from user 102. User 102 may be associated with a separate system of user applications, tools, and/or plug-ins 104 for customizing the hosted service. Data associated with the separate system may be stored in user data store(s) 106. User 102 may provide extensions (plug-ins) to the hosted service for additional or customized functionality, where the plug-ins are registered and executed along with the core platform operations. According to some embodiments, such plug-ins may not only provide additional functionality, but also expand existing default functionality of the service.

User 102 may provide the plug-ins itself or request a plug-in from a third party (not shown) to be registered by the hosted service. In such a scenario, the hosted service may interact with the third party provider directly for registering the plug-in in the platform. Furthermore, third party providers may contact the hosted service upon request of a user (tenant) to register one or more of their extensions and provide credentials ensuring the hosted service that the offered plug-in is truly requested by the user.

This complex interaction, of course, may result in challenges for the service to control its operational integrity and security of user data. Not all third party providers may be trusted sources, there may be compatibility issues associated with the service platform and the plug-in(s), and an integration of the plug-in into the operational structure of the service may not be simple.

According to some embodiments, a flexible and extensible platform with plug-in functionality based on pipeline architecture may be executed serially in response to a client request. A request object may be passed as a parameter to each plug-in in the pipeline, and each plug-in can create or manipulate the response object. Arbitrary state may also be passed along the pipeline to pass data among plug-ins.

Figure 2:
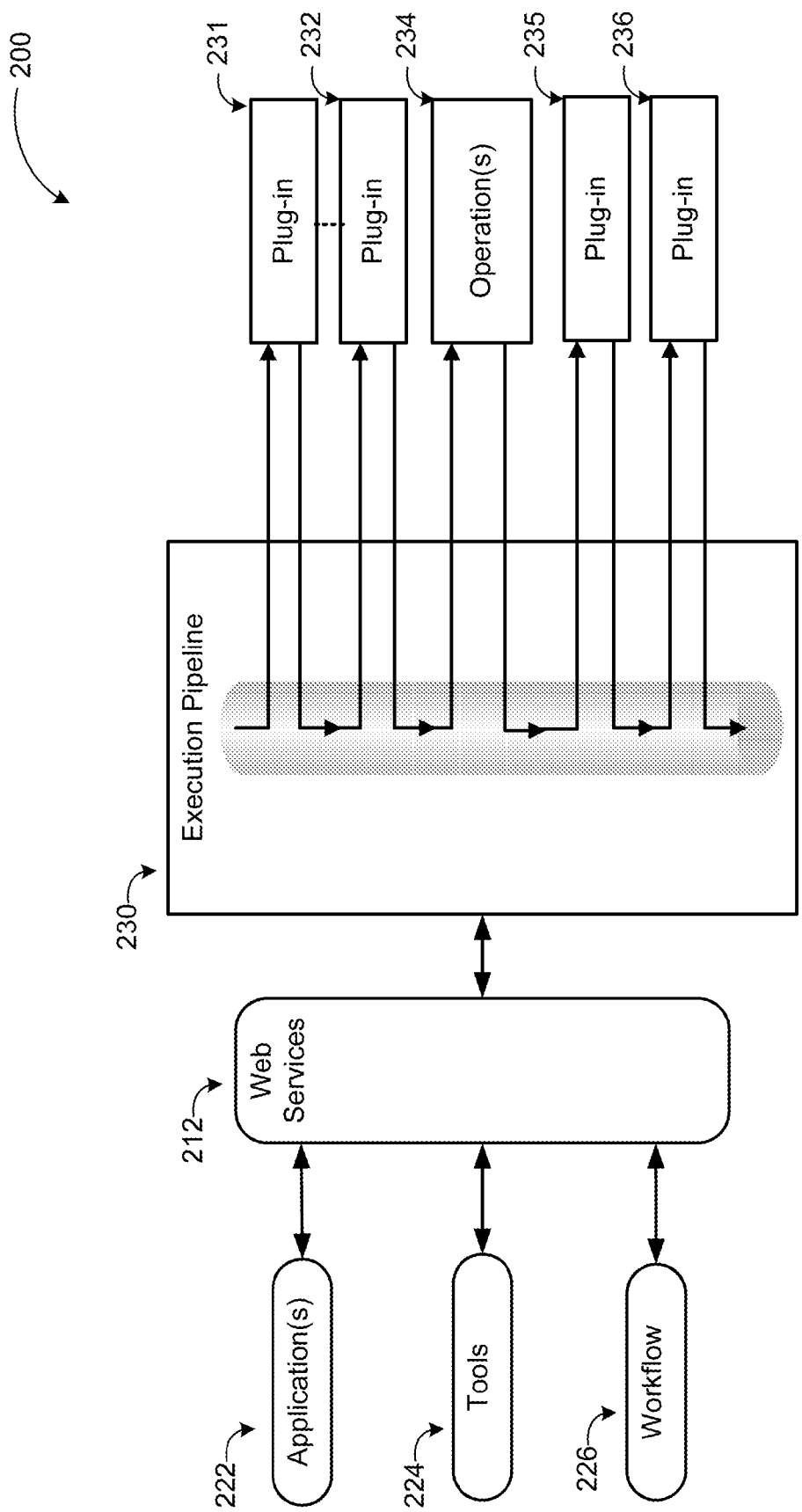
FIG. 2 illustrates main components in a service-oriented system with pipeline architecture.

FIG. 2 illustrates main components in a service-oriented system with pipeline architecture. A system according to embodiments may employ a pipeline architecture defining a flexible and extensible platform through plug-in functionality in response to a client request. Request objects are passed as a parameter to each plug-in in the pipeline, which can create or manipulate the response object. If two client requests operate with the same pipeline, their behavior should be identical. As such, the matrix of cases to test in such a system is reduced compared to systems that hard-code behavior.

The sequence of actions to execute in response to a client request is represented, in a system according to one embodiment, by a pipeline configuration. The order of actions in the pipeline can be determined through a dependency graph analysis. New actions can be configured without recompilation of the system through registration of a "plug-in" in the pipeline configuration. This way, new functionality may be added or existing functionality modified, forming a dynamic and extensible execution model. More importantly, pipeline configuration consists of dependency information defining a sequence of actions to be executed as well as the actual plug-in code module.

Actions in the service-oriented pipeline architecture may also be asynchronous, in which case the state of the pipeline may be saved and restored to be processed. Thus, asynchronous actions cannot affect the response. According to some embodiments, the plug-in configuration (including plug-in code) may be stored centrally allowing for cluster based systems that have a coherent view of the current pipeline configuration.

According to one embodiment, a service-oriented architecture may be implemented as the front end for invocation of a pipeline architecture system. The pipeline configuration (including plug-in code) can be then configured through the Application Programming Interface (API) of the service oriented system (e.g. through web services). Plug-in execution may use a managed execution environment to enforce limited trust for plug-ins depending on their author (e.g. determined by code signing).

In order to build a plug-in for a service-oriented system according to embodiments, implementers may design an interface through which the plug-in code is to be invoked. Upon invoking a plug-in, the system may pass a context object with the current state of the pipeline. From this context object, the plug-in can obtain an interface through which additional system functionality can be executed.

As shown in the figure, web services 212 interacts with applications 222, tools 224, and workflow (business process) 226 to process user requests. In addition, web services 212 receives user plug-ins (e.g. 231, 232, 235, 236) to perform user-defined actions. User-defined actions through plug-ins may include customization by extension of existing functionalities or new functionality that is parallel to existing functionality. The plug-ins are registered in the API through metadata, which may include and order and stage of the plug-ins (e.g. has an operation been cancelled, completed, etc, before another plug-in is to be activated). Plug-ins can then be executed (by the execution pipeline 230) along with platform operations 234, some before (e.g. 231, 232), some after (e.g. 235, 236) depending on their order of registration as defined by the metadata.

In an example scenario, one plug-in may be configured to update contact information as new information is added or existing information modified (deleted), while another plug-in executed in series with the first plug-in is employed to audit the user's contact records based on the updates performed by the first plug-in. In a system according to embodiments, the plug-ins are given the ability to define their own transaction boundary enabling a flexible and extensible system. The plug-ins may be executed in series or in parallel. Embodiments are not limited to one particular method of execution.

As mentioned previously, a system according to embodiments may include many instances of the individual servers and processing hosts (e.g. asynchronous processing hosts). By implementing a reliable queue of the processes where long running requests are queued by the individual servers for later processing, each of these server clusters may be scaled independently.

The ability to invoke system behavior from such plug-ins, even in a managed execution environments, opens the possibility of infinite loops. This can result in system performance degradation, especially for other tenants in a multi-tenant system. Such loops may include degenerate loops that accidentally or maliciously generate infinite amount of data or non-degenerate loops that are infinite but not degenerate (e.g. birthday reminders that are to be processed once a year for an indeterminate period). In order to terminate (or control) such loops, a default "budget" and a correlation id may be set when client requests are received. Upon invoking system methods within a plug-in, the correlation identifier and a portion of the budget may be passed along. If a child invocation has insufficient budget it results in an error terminating the loop.

A system according to embodiments assigns a cost for each operation against the set budget, which is distributed among child operations. Thus, an action that has been independently initiated by a caller and does not have previous context associated with it, and an action that is a result of another action (e.g. child action) with inherited context can be tracked by using accounts for operations associated with a caller. For example, a user may call to create a new account via web services, and the creation of the account may cause a plug-in to invoke a call that creates a task. A call to create a task has context inherited from the original creation of the account. If a new account is being created, the budget may be set at that time and each time an operation is performed for that account, the budget may be decremented. According to another embodiment, a depth parameter may be utilized to terminate infinite loops. A count of number of operations (children) may be set initially and incremented as additional operations are performed (children created). When the initially set depth limit is reached, the loop is terminated.

Time based resetting of the budget may be employed, according to other embodiments, to allow infinite loops that are non-degenerate, such as asynchronous events timed to sleep for a year before waking up for a birthday reminder. The system may reset the budget or the depth, if there is a predefined delay in the operational sequence. Yet another embodiment employs exception for finite tree structured operations (children) in infinite loop detection and termination. For example, regional account creations may be non-uniform (each state has varying number of sales regions) resulting in a finite tree structure. A budget based loop detection algorithm may attempt to terminate operations if the budget (or depth) is distributed in a fixed manner to all children. The system may be configured to take into account such finite tree structures as and exempt them when loop detection is performed.

Figure 3:
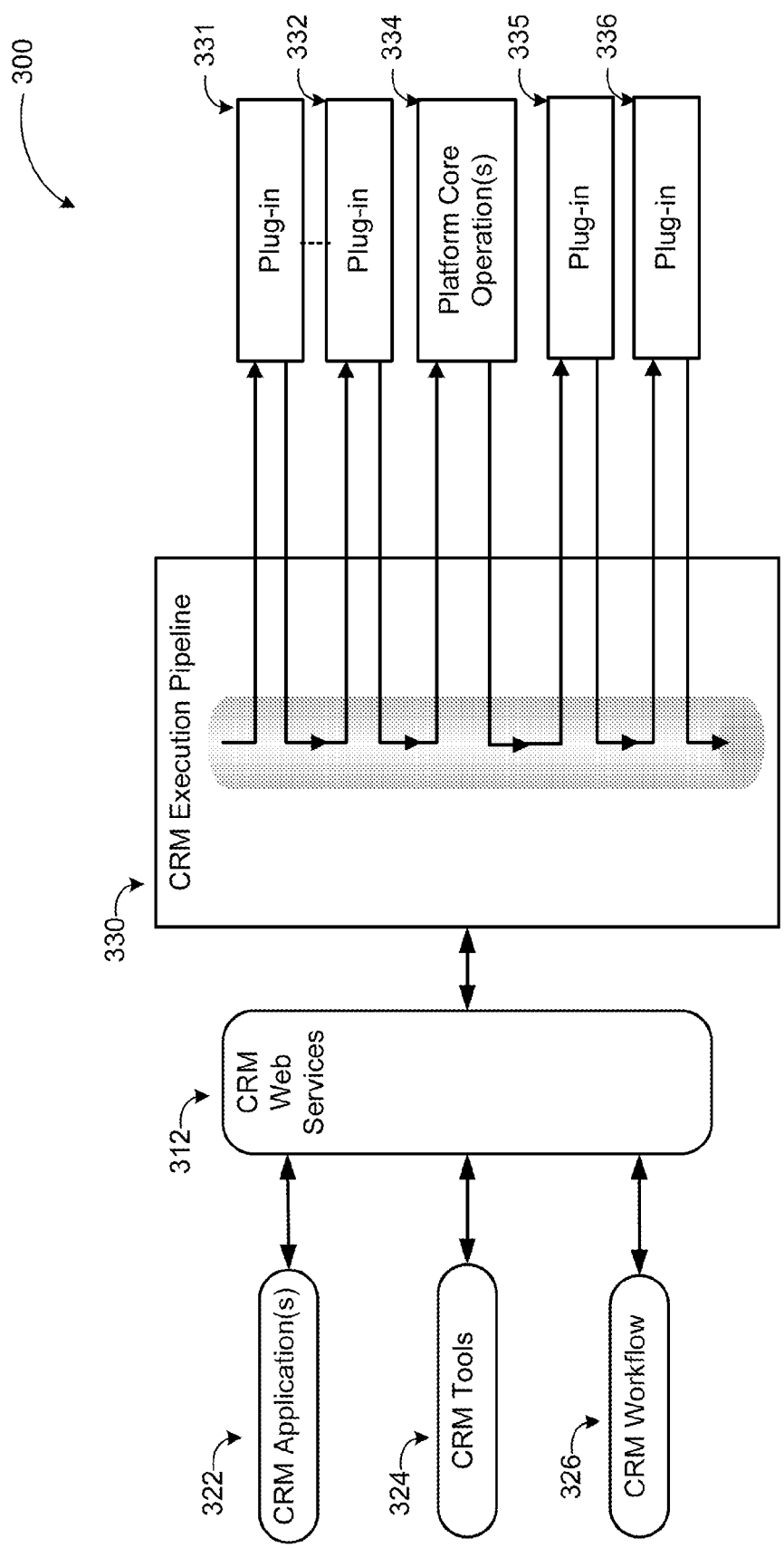
FIG. 3 illustrates an example service-oriented system (CRM) with pipeline architecture.

FIG. 3 illustrates an example service-oriented system (CRM) with pipeline architecture. CRM systems are an example of a multi-tenant system where customers are able to sign in to their organization (tenant), which is logically their own database of CRM data. Customers can make requests that such as create an account, send an e-mail, or delete a contact. These requests are processed on a cluster of servers.

In the example system 300 of FIG. 3, CRM web services 312 processes such user requests by executing platform core operations 334 (default functionality) along with plug-ins 331, 332, 335, 336 that provide extended or alternative functionality allowing the service to be customized for the user. The plug-ins are executed in the CRM execution pipeline 330 serially and their sequence may be defined by the user (331, 332, 335, 336). According to one implementation, the plug-ins may be grouped as pre-event and post-event operations for pre-processing or post-processing data handled by the core functionality, but this grouping is not a limitation. In a system according to embodiments, the plug-ins and the core operations may be grouped in any manner or not grouped at all.

CRM web services 312 may interact with specific CRM application 322, utilize CRM tools 324, and store business processes as CRM workflow 326. According to an example implementation, utilizes CRM web services 312 may be utilized as a transport for user requests. A relational database such as a Structured Query Language (SQL) database may be used as a repository of the pipeline configuration, and another database may be used as a repository of plug-in code modules.

The service-oriented systems and operations described in FIGS. 2 and 3 are exemplary for illustration purposes. A system for employing pipeline architecture in a multi-tenant service may be implemented using additional or fewer components and other schemes using the principles described herein.

Figure 4:
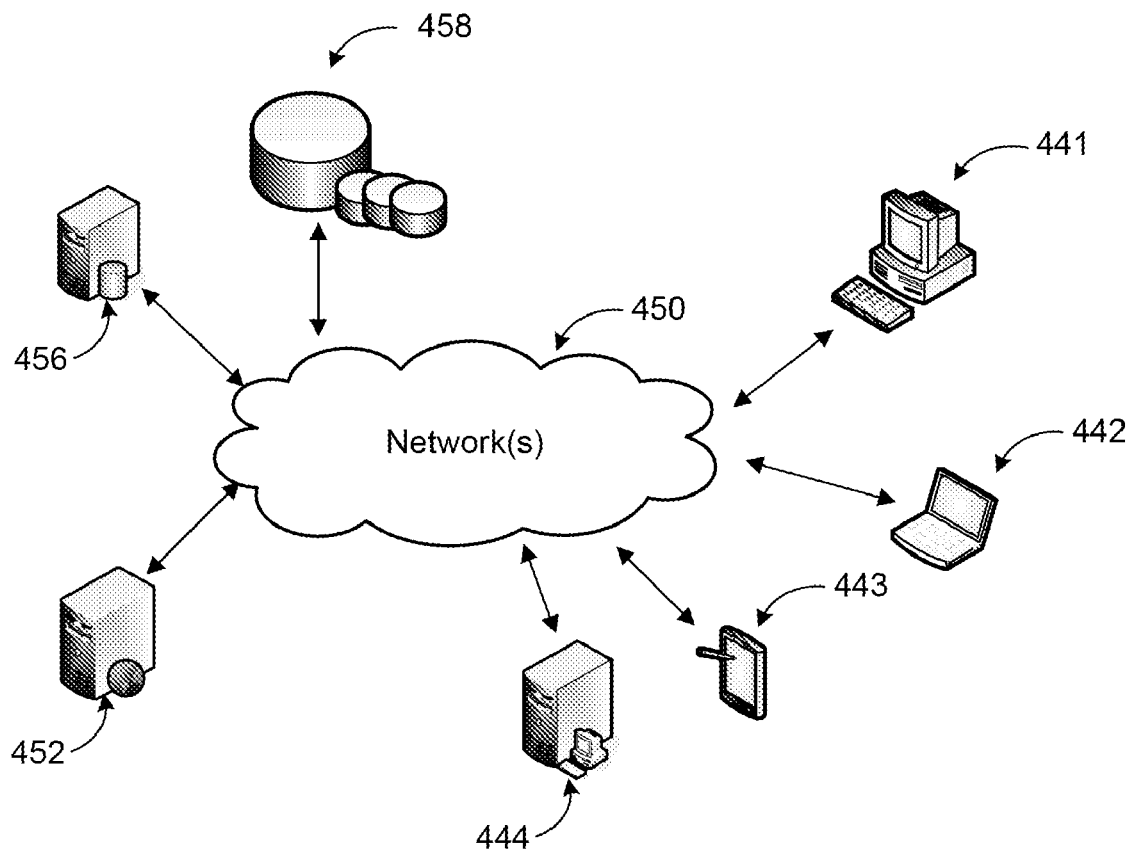
FIG. 4 is a diagram of an example networked environment, where embodiments may be implemented.

FIG. 4 is an example networked environment, where embodiments may be implemented. Service-oriented systems employing pipeline architecture may be implemented in a distributed manner over a number of physical and virtual clients and servers. They may also be implemented in un-clustered systems or clustered systems employing a number of nodes communicating over one or more networks (e.g. network(s) 450).

Such a system may comprise any topology of servers, clients, Internet service providers, and communication media. Also, the system may have a static or dynamic topology. The term "client" may refer to a client application or a client device. While a networked system implementing pipeline architecture in a multi-tenant service may involve many more components, relevant ones are discussed in conjunction with this figure. Furthermore, a system according to embodiments may also be a single-tenant system for serving users associated with a single tenant.

Requests for processing may come from users through individual client devices 441-443. The users themselves or a third party provider (through server 444) may provide plug-ins for extended or additional functionality to the pipeline architecture service managed by one or more servers (e.g. server 452). The service may also be implemented, in one or more servers. Tenant databases may be embodied in data stores 458. Dedicated database servers (e.g. database server 456) may be used to coordinate data retrieval and storage in one or more of such data stores.

Network(s) 450 may include a secure network such as an enterprise network, an unsecure network such as a wireless open network, or the Internet. Network(s) 450 provide communication between the nodes described herein. By way of example, and not limitation, network(s) 450 may include wired media such as a wired network or direct-wired connection, and wireless media such as acoustic, RF, infrared and other wireless media.

Many other configurations of computing devices, applications, data sources, data distribution systems may be employed to implement pipeline architecture in a service-oriented system. Furthermore, the networked environments discussed in FIG. 4 are for illustration purposes only. Embodiments are not limited to the example applications, modules, or processes.

Figure 5:
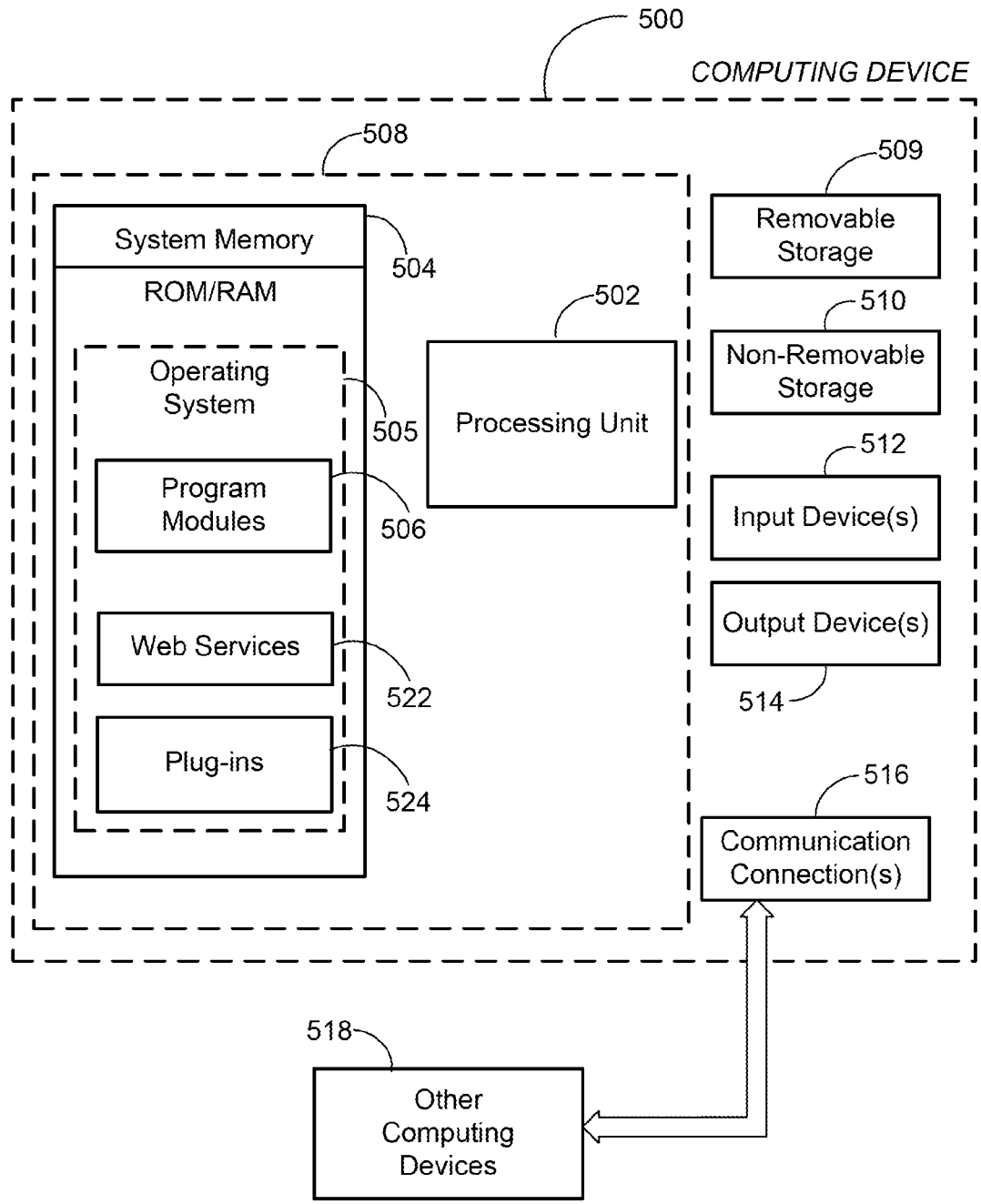
FIG. 5 is a block diagram of an example computing operating environment, where embodiments may be implemented.

FIG. 5 and the associated discussion are intended to provide a brief general description of a suitable computing environment in which embodiments may be implemented. With reference to FIG. 5, a block diagram of an example computing operating environment is illustrated, such as computing device 500. In a basic configuration, the computing device 500 may be a server providing services associated with a service-oriented system employing pipeline architecture and typically include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of a networked personal computer, such as the WINDOWS® operating systems from MICROSOFT CORPORATION of Redmond, Wash. The system memory 504 may also include one or more software applications such as program modules 606, Web services 522, and plug-in(s) 524.

Web services 522 may be a separate application or an integral module of a hosted service application that provides data and processing services to client applications associated with computing device 500. Plug-ins 524 may provide additional functionality customizing the operations of web services 522 for specific users and/or operations, as described previously. This basic configuration is illustrated in FIG. 5 by those components within dashed line 508.

The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of device 500. Computing device 500 may also have input device(s) 512 such as keyboard, mouse, pen, voice input device, touch input device, etc. Output device(s) 514 such as a display, speakers, printer, etc. may also be included. These devices are well known in the art and need not be discussed at length here.

The computing device 500 may also contain communication connections 516 that allow the device to communicate with other computing devices 518, such as over a wireless network in a distributed computing environment, for example, an intranet or the Internet. Other computing devices 518 may include server(s) that execute applications associated with another service or third party providers that provide plug-ins. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
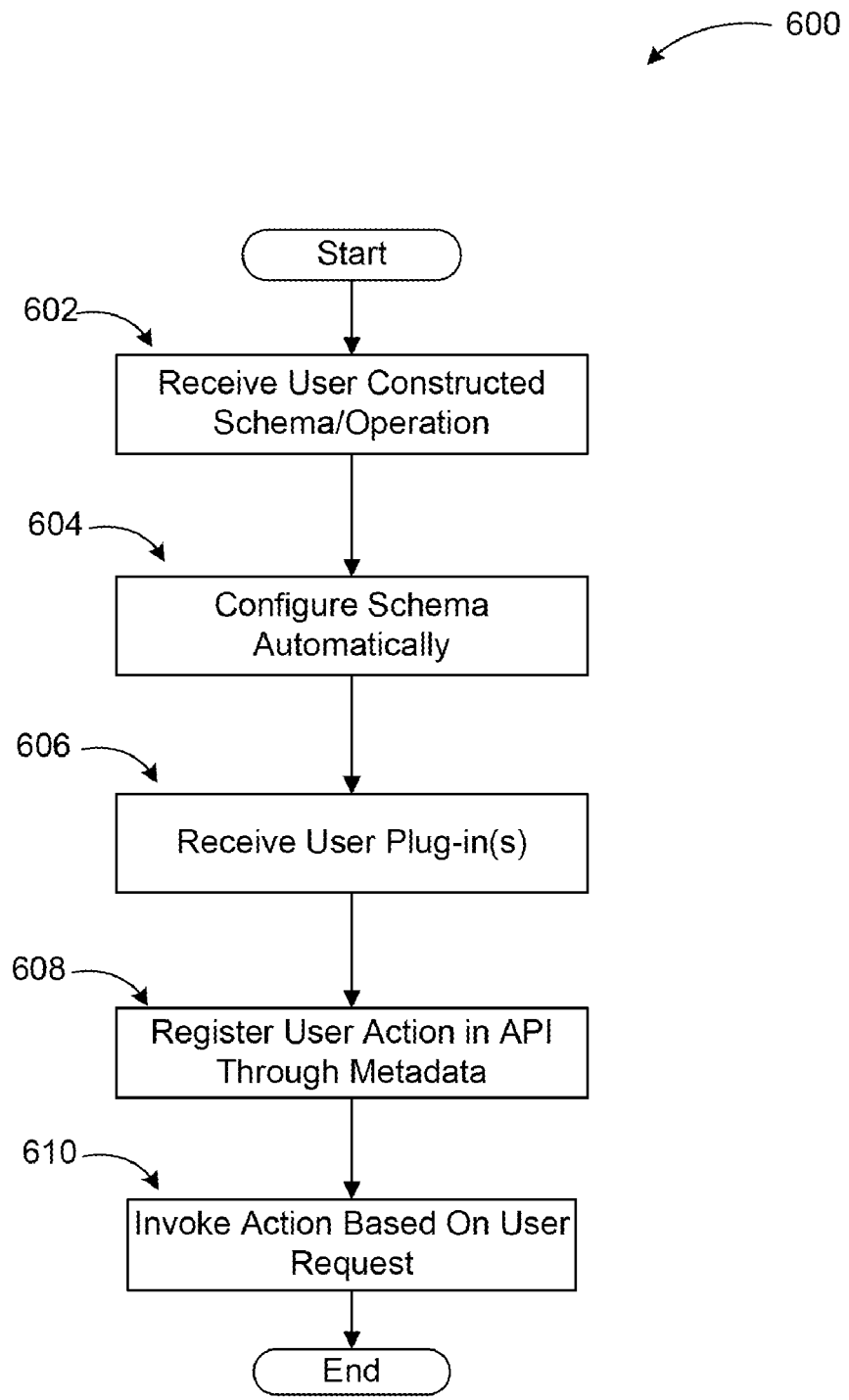
FIG. 6 illustrates a logic flow diagram for a process of managing operations in a service-oriented system with pipeline architecture.

FIG. 6 illustrates a logic flow diagram for process 600 of managing operations in a service-oriented system with pipeline architecture. Process 600 may be implemented, for example, as part of a hosted CRM service.

Process 600 begins with operation 602, where a user constructed schema (and/or operation) is received by the pipeline architecture service. The schema (and/or operation) is associated with one or more plug-ins that may be provided by the user or by a third party authorized by the user. Processing advances from operation 602 to operation 604.

At operation 604, the schema is configured automatically. For example, in a CRM system utilizing SQL databases, SQL data (queries) may be generated based on the schema, associated metadata, and the operations themselves. The system does not perform any operations yet, since no actions have been requested by the user associated with user data. Processing moves to operation 606 from operation 604.

At operation 606, user plug-ins are received. The plug-ins perform user requested actions providing extended or alternative functionality in a symmetric fashion to the service's core functionality. Processing proceeds to operation 608 from operation 606.

At operation 608, the user actions are registered in the system API through metadata, which also includes an order and stage or each plug-in when they are executed in the pipeline. Processing moves from operation 608 to operation 610, where upon request from the user, the service executes the registered plug-ins in the specified order for processing the user data. The system may perform additional operations such as a dependency analysis to order the pipeline operations (as plug-ins are uploaded) enabling multiple parties to extend the system and work predictably. Processing moves to a calling process from operation 610 for further operations.

As mentioned previously, by allowing users to register and have executed their own extensions in any order (and on the fly), the system may be vulnerable to performance degradation due to accidentally or maliciously generated infinite loops. Therefore, a loop detection mechanism may be employed to detect and terminate infinite loops while allowing certain quasi-infinite (infinite but non-degenerate) loops to be exempted from termination. Such mechanisms are discussed in more detail below.

Figure 7:
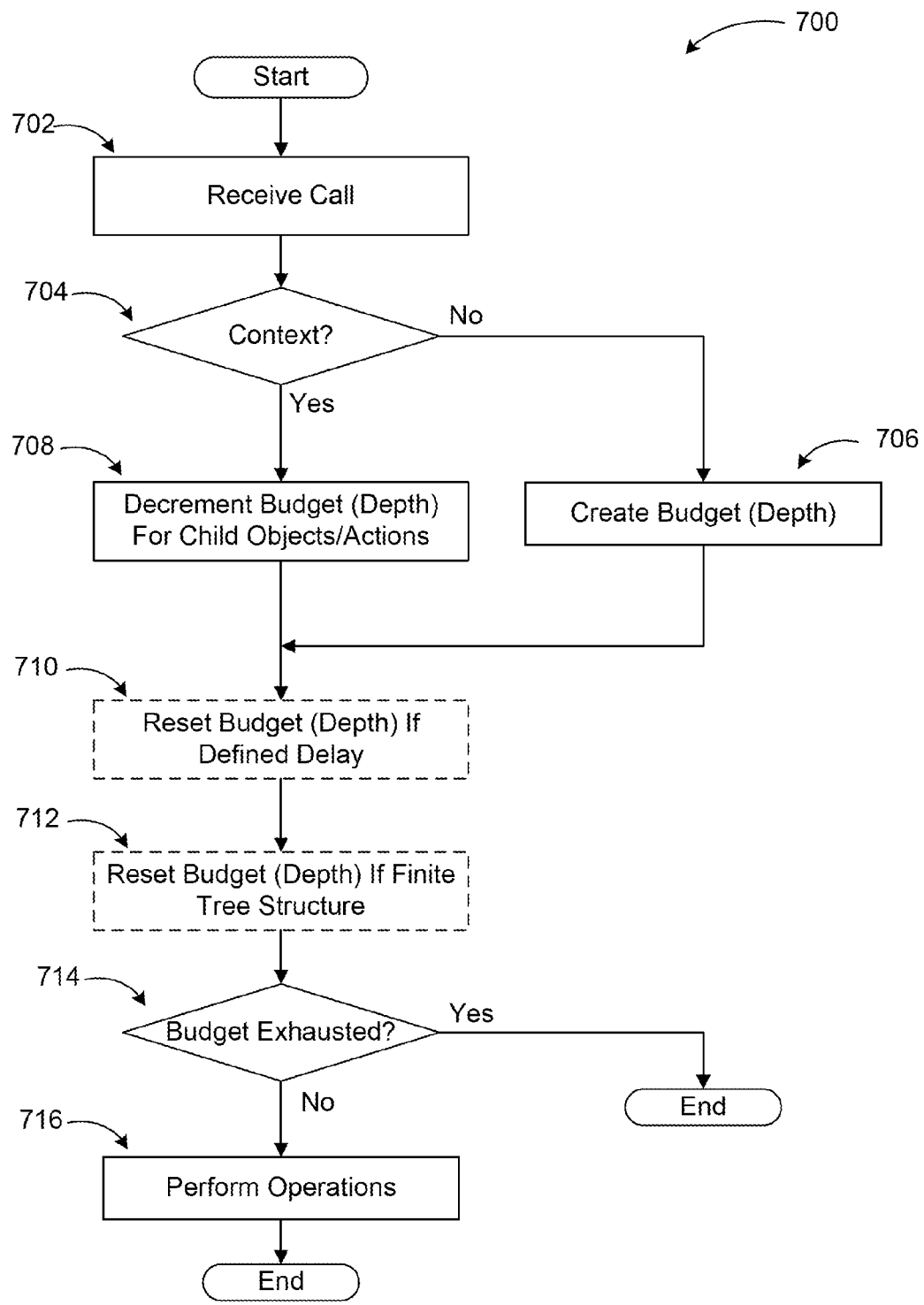
FIG. 7 illustrates a logic flow diagram for a process of loop detection in a service-oriented system with pipeline architecture.

FIG. 7 illustrates a logic flow diagram for process 700 of loop detection in a service-oriented system with pipeline architecture. Process 700 may be implemented within the operations management process 600 of FIG. 6.

Process 700 begins with operation 702, where a call is received. The call may be for a first action or for an action on an existing account. This is determined by the system by checking a context passed along with the call. Processing proceeds to decision operation 704 from operation 702.

At decision operation 704, a determination is made whether the passed context includes an existing budget (depth) or not. If no existing budget (depth) is found for the requested action, one is created in at operation 706. If an existing budget (depth) is found associated with the call, the budget (or depth) is decremented at operation 708 based on the number or type of operations associated with the call. Every operation has a cost against the budget, which is distributed among the children. A depth that is based on the count of children or operations may also be used instead of a budget as discussed before.

Skipping the optional operations 710 and 712 for now, at decision operation 714, a determination is made whether the assigned budget is exhausted. If the budget is exhausted, operations are terminated. If there is still available budget, the operations associated with the call are performed at subsequent operation 716.

While preventing degenerate loops, a system according to embodiments may also facilitate exceptions for seemingly infinite loops, which should not be terminated as part of standard operating procedure. For example, a birthday reminder operation for a contact is one that is set for an indeterminate time. Therefore, the system can perceive it as an infinite loop and attempt to terminate it. Optional operation 710 following operation 708 is intended to make that exemption. The budget (depth) is reset if the operations include a predefined delay (such as the one year delay between birthday reminders).

Another example exception is operations involving finite tree structure. For example, sales regions for a CRM service may be non-uniformly distributed. While one state may be assigned one sales region, another more populous state may be assigned multiple sales regions. If a fixed depth or budget assignment is employed among children, the system may again perceive this action as being infinite and try to terminate it. At optional operation 712, the budget or depth may be reset if the call involved a finite tree structure, thereby preventing termination of the operations prematurely.

The operations included in processes 600 and 700 are for illustration purposes. Providing a hosted service employing pipeline architecture may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for implementing a pipeline architecture in a service-oriented system, the method comprising:
  automatically configuring a user constructed schema;
  receiving a plug-in associated with the schema;
  registering the plug-in through metadata, wherein the metadata includes at least one of: an order and a stage of the plug-in;
  receiving another plug-in;
  configuring the schema without compilation by registering the other plug-in;
  analyzing dependency information provided by the metadata to determine an order of the plug-ins and the core platform operations;
  assigning a budget to a plurality of actions, wherein a portion of the assigned budget is apportioned to each of a plurality of child actions;
  upon invoking a system method within a plug-in, passing the portion of the budget along with a correlation identifier assigned to each child action;
  decrementing the budget for each child action to be performed based on a predetermined cost of each operation associated with a child action;
  if the budget is exhausted, terminating the operations and providing an error message;
  resetting the decrementing of the budget if a predefined delay is included in an operational sequence associated with an action; and
  resetting the decrementing of the budget if the action includes a finite tree structure of child actions; and
  in response to receiving a call for an action from the user, executing the plug-in according to the received order along with one or more core platform operations in an execution pipeline, wherein executing the plug-in includes:
  passing a request object to the plug-in, such that the plug-in is enabled to manipulate a response object; and
  passing an arbitrary state associated with the execution to the plug-in.

2. The method of claim 1, further comprising:
  passing a request object to the plug-in during execution, such that the plug-in is enabled to manipulate a response object.

3. The method of claim 1, further comprising:
  passing an arbitrary state associated with the execution to the plug-in.

4. The method of claim 1, wherein the plug-in and the core platform operations are executed in one of: a serial manner and a parallel manner.

5. The method of claim 1, wherein the plug-in is for one of: adding new functionality and extending an existing functionality of the service-oriented system.

6. The method of claim 1, wherein the plug-in configuration and the plug-in code is stored centrally in the service-oriented system.

7. The method of claim 1, wherein the service-oriented system is configured to execute at least one of: a synchronous process and an asynchronous process.

8. The method of claim 7, wherein executing the asynchronous process further comprises:
  saving a state of the pipeline; and
  subsequently restoring the state of the pipeline for processing.

9. A service-oriented system including at least one processor for implementing a pipeline architecture, comprising:
  at least one web server configured to:
    receive a user constructed schema;
    automatically configure the schema;
    receive a plurality of plug-ins for one of: adding new functionality and extending an existing functionality of the service-oriented system associated with the schema; register the plug-ins through metadata, wherein the metadata includes at least one of: an order and a stage of the plug-ins;
    analyze dependency information provided by the metadata to determine an order of the plug-ins and core platform operations;

assign one of a budget and a depth parameter to each of a plurality of actions, wherein a portion of the assigned one of the budget and the depth parameter is apportioned to each of a plurality of child actions;

upon invoking a system method within a plug-in, pass the portion of one of the budget and the depth parameter along with a correlation identifier assigned to each child action;

decrement one of the budget for each child action to be performed, wherein the budget is decremented based on a cost of each operation associated with a child action; and increment a depth parameter for each child action to be performed based on a count of child actions associated with the requested action;

if one of the budget and the depth parameter reaches a corresponding predefined threshold, terminate the operations and provide an error message; and an execution pipeline configured to:
execute the plug-ins upon receiving a request from the user according to the received order along with the core platform operations by passing a request object to the plug-ins such that the plug-ins are enabled to manipulate a response object and by passing an arbitrary state associated with the execution to the plug-ins.

10. The system of claim 9, wherein the service-oriented system is implemented as a front end for invocation of a pipeline architecture system.

11. The system of claim 9, wherein the plug-ins are registered through an Application Programming Interface (API) of the service-oriented system, and wherein the pipeline is configured through the API.

12. The system of claim 9, wherein the execution pipeline is further configured to:
upon invoking a plug-in, pass a context object with a current state of the pipeline to the plug-in such that the plug-in is enabled to obtain an interface for executing additional system functionality.

13. The system of claim 9, wherein the at least one web server is scalable, and wherein the system is enabled to facilitate multiple instances of the server.

14. The system of claim 13, wherein the at least one web server is further configured to:
reset the decrementing of one of the budget and the incrementing of the depth parameter if a predefined delay is included in an operational sequence associated with an action; and reset the decrementing of one of the budget and incrementing of the depth parameter if the action includes a finite tree structure of child actions.

15. A computer-readable storage device with instructions stored thereon, which when executed by a computer, will cause the computer to perform a method for implementing a pipeline architecture in a service-oriented system, the method comprising:
receiving a user constructed schema;
automatically configuring the schema;
receiving a plug-in associated with the schema for one of: adding new functionality and extending an existing functionality of the service-oriented system;
registering the plug-in through metadata, wherein the metadata includes at least one of: dependency information and a stage of the plug-in;
analyzing dependency information provided by the metadata to determine an order of registered plug-ins and core platform operations;
assigning a budget to each of a plurality of actions, wherein a portion of the assigned budget is apportioned to each of a plurality of child actions;
upon invoking a system method within a plug-in, passing the portion of the budget along with a correlation identifier assigned to each child action;
decrementing the budget for each child action to be performed based on a predetermined cost of each operation associated with a child action;
if the budget is exhausted, terminating the operations and providing an error message; and
executing the plug-in according to the received order along with the core platform operations in an execution pipeline, wherein executing the plug-in includes:
passing a request object to the plug-in, such that the plug-in is enabled to manipulate a response object; and
passing an arbitrary state associated with the execution to the plug-in.

16. The computer-readable storage device of claim 15, wherein the method further comprises:
resetting the decrementing of the budget if a predefined delay is included in an operational sequence associated with an action; and
resetting the decrementing of the budget if the action includes a finite tree structure of child actions.

* * * * *